(No Model.)
C. W. GRAY.
LATHE CHUCK.
No. 286,426. Patented Oct. 9, 1883.
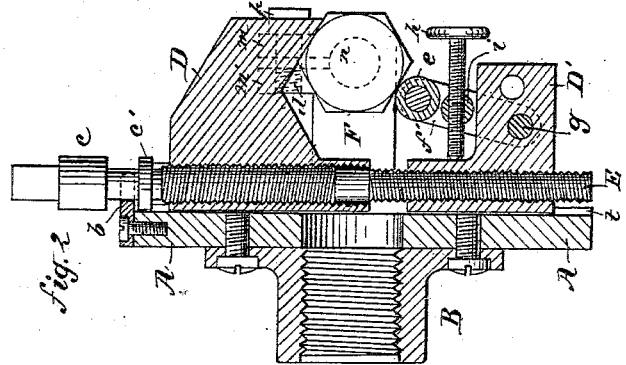
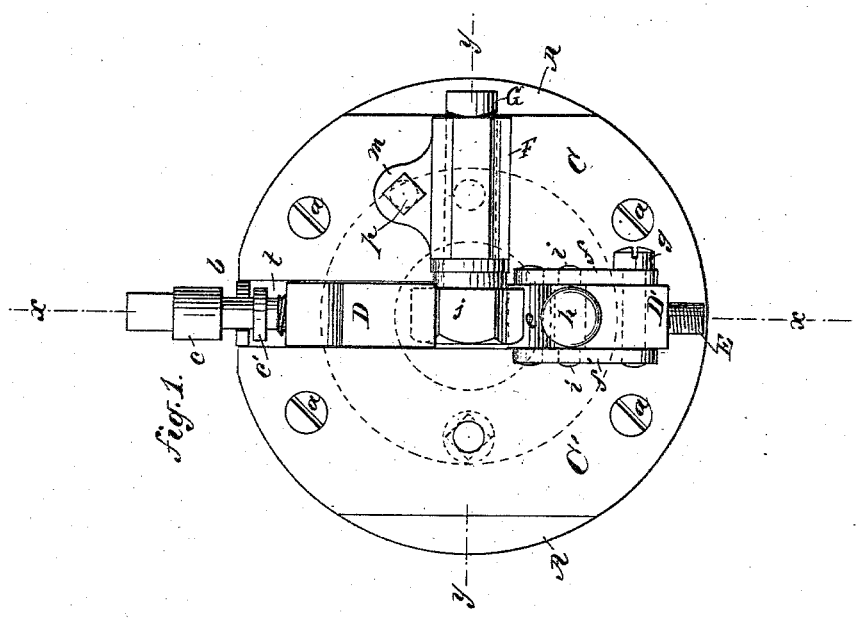
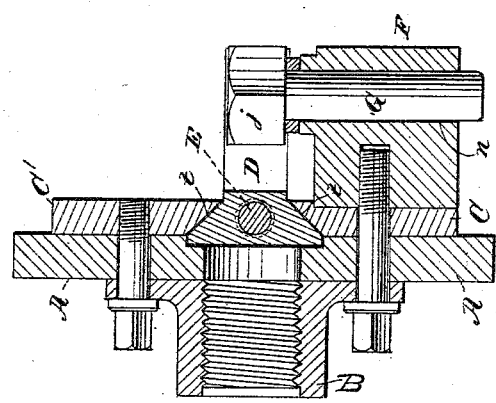
Witnesses:
Inventor
Charles W. Gray
by J. T. Fitch
his Atty

UNITED STATES PATENT OFFICE.

CHARLES W. GRAY, OF MINNEAPOLIS, MINNESOTA.

LATHE-CHUCK.

SPECIFICATION forming part of Letters Patent No. 286,426, dated October 9, 1883.

Application filed June 13, 1883. (No model.)

*To all whom it may concern:*

Be it known that I, CHARLES W. GRAY, of Minneapolis, in the county of Hennepin and State of Minnesota, have invented a new and useful Improvement in Lathe-Chucks, of which the following is a specification, reference being had to the accompanying drawings, forming part of the same, in which—

Figure 1 is a front face view of a chuck containing my invention. Figs. 2 and 3 are sections of the same, the former on line $x\ x$, and the latter on line $y\ y$, Fig. 1.

My invention relates to a lathe-chuck specially adapted to hold and rotate in a lathe nuts and headed bolts, and present the edge of the same to the cutting-tool, so that any number of plane surfaces are formed by turning instead of planing, as is usually done; and it consists in the combination of devices herein described and claimed.

A is the face-plate, provided with the usual screw-tapped socket, B, to be screwed onto the end of the lathe-mandrel. On the face of this plate are fastened, preferably by screws $a$, two plates, C C', arranged, as shown in Fig. 1, so as to leave between their inner beveled edges, across the center of the face-plate, a dovetail way or groove, $t$, in which the jaws of the chuck D D' are placed and adjusted to and from the center of the face-plate. The said jaws are made with broad bases that are beveled on their upper surfaces to fit the bevel of the edges of the plates, as shown plainly in Fig. 3. Preferably a groove is cut in the face of the plate A itself, in which the lower portions of the bases of the jaws fit, as shown in said figure, whereby the jaws are held more securely on the plate. The jaws are drilled through at their bases, and the holes tapped one with a right-hand and the other with a left-hand screw-thread. E is a shaft, one half of its length having a right-hand and the other half a left-hand screw-thread, which, working in the said jaws, as shown in said figure, will act to draw the jaws together when turned in one direction and to separate them when turned in the opposite direction. The said screw-shaft, near its outer end, fits into a semicircular notch in the stop $b$, secured to the edge of the face-plate, and $c\ c'$ are collars on the said shaft, with space between them to allow of some longitudinal movement of the shaft in said notch, in order to permit of the adjustment of the jaws to a nut or bolt-head when the latter is held centrally on the face-plate. The gripping portion $d$ of the inner face of the jaw D is inclined at such an angle to the axis of the chuck that when one plane of the edge of a five or more sided nut or bolt-head is pressed against it the adjacent outer plane of said edge will be parallel to the face-plate and at right angles to the axis of the chuck, jaws of different inclination being provided, each to fit the particular form of nut or bolt-head intended to be held by it. The jaw D', instead of fitting against the nut or bolt-head, like the jaw D, has swung to it a friction-roller, $e$, journaled in the arms $f\ f'$, that are pivoted to said jaw by a bolt, $g$. $h$ is a set-screw, which works in a screw-tapped hole in the roller $i$, also journaled in the arms $f\ f'$. By means of this screw the roller $e$ may be adjusted against the side of the nut or bolt-head diametrically opposite to the side in contact with the face of the jaw D. By the described arrangement of parts the nut or bolt-head, when the jaws are drawn together, readily adjusts itself to the face of the jaw D without objectionable friction.

F is the rest, in which is supported the body of the bolt, the head of which is to be turned, or the mandrel on which the nut to be turned is placed. It consists of a strong standard or post bolted firmly onto the face-plate, preferably set into a notch or square groove cut in the face of the plate C. Near the top it is drilled through in a direction at right angles to the groove $t$, forming a socket, $n$, to receive the body of the bolt whose head is to be turned and squared, or the mandrel that is to hold the nut to be turned and squared. G represents such bolt or mandrel, and $j$ the head of the bolt or a nut. The mandrel is provided with a screw-thread and shoulder at its inner end, and the nut, being first screw-tapped, is screwed down tightly onto the said shoulder. This rest F is so constructed and arranged that it holds the bolt or mandrel so that the head or nut, as the case may be, is in the axis of the chuck. For the purpose of tightening the bolt or mandrel in the rest, the body of the rest is cut through longitudinally on one side into the socket $n$, as seen in dotted lines in Fig. 1. There is some space between the edges of this cut, and on either side of the cut a lip, the two lips $m\ m'$ being shown also in dotted lines in said Fig. 1. By means of a screw-bolt, $p$, these lips may be drawn slightly together, the metal of the rest allowing of sufficient spring to tighten the bolt or mandrel G by screwing in said bolt $p$.

In using this chuck the bolt G, being properly forged, the body of the bolt is inserted in the socket $n$, so that the head is in line with the axis of the chuck. The jaws then being closed in upon the head, one of the flat faces of the edge of the head will be in a plane at right angles to the axis of the chuck. The chuck being now rotated on its axis, the said face may be turned off by the common cutting-tool. When this is done, the jaws are drawn back and the bolt is turned in the socket, so as to bring the turned face over opposite the upper inclined face, $d$, of the jaw D, where it is held by tightening the jaws, and so in succession the several faces of the head or nut are turned.

Different-sized jaws and rests are provided for various sizes of bolts and nuts.

What I claim as my invention, and desire to secure by Letters Patent, is—

1. The combination, with the face-plate of a chuck, of the described jaws D D' and the rest F, as and for the purpose described.

2. The combination, in a chuck, of the jaw D and the jaw D', the roller $e$, hinged to the body of the jaw, and the set-screw $h$, arranged to limit the movement of the said roller, all as and for the purpose described.

CHARLES W. GRAY.

In presence of—
  A. G. N. VERMILYA,
  A. S. FITCH.